United States Patent
Ni

(10) Patent No.: US 9,621,315 B2
(45) Date of Patent: Apr. 11, 2017

(54) METHOD FOR ALLOCATING MULTI-UES' SOUNDING REFERENCE SIGNAL (SRS) UPLINK RESOURCES AND ENB

(75) Inventor: Huan Ni, Nanjing (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 734 days.

(21) Appl. No.: 14/110,517

(22) PCT Filed: Apr. 26, 2012

(86) PCT No.: PCT/CN2012/074761
§ 371 (c)(1),
(2), (4) Date: Oct. 8, 2013

(87) PCT Pub. No.: WO2012/146188
PCT Pub. Date: Nov. 1, 2012

(65) Prior Publication Data
US 2014/0029569 A1  Jan. 30, 2014

(30) Foreign Application Priority Data
Apr. 27, 2011  (CN) .......................... 2011 1 0117765

(51) Int. Cl.
*H04L 5/00* (2006.01)
*H04L 25/02* (2006.01)
(Continued)

(52) U.S. Cl.
CPC .......... *H04L 5/0048* (2013.01); *H04W 24/02* (2013.01); *H04L 25/0224* (2013.01); *H04W 16/10* (2013.01); *H04W 72/042* (2013.01)

(58) Field of Classification Search
CPC combination set(s) only.
See application file for complete search history.

(56) References Cited

U.S. PATENT DOCUMENTS

2009/0034468 A1  2/2009 Muharemovic et al.
2009/0323664 A1  12/2009 Li et al.
(Continued)

FOREIGN PATENT DOCUMENTS

CN  101330325 A  12/2008
CN  101335969 A  12/2008
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Physical Channels and Modulation (Release 8)", 3GPP TS 36.211 V8.8.0, Technical Specification, Sep. 1, 2009, pp. 1-83, 3GPP, France.
(Continued)

*Primary Examiner* — Yee Lam
(74) *Attorney, Agent, or Firm* — Coats and Bennett, PLLC

(57) ABSTRACT

The present invention is to provide a method for allocating multi-UEs' Sounding Reference Signal (SRS) uplink resources, and an eNB for allocating multi-UEs' SRS uplink resources with the method. The method may automatically and dynamically allocate multi-UEs' SRS resource in both the time domain resource and the frequency domain resource in accordance with system capacity attribute value and configured SRS transmission period. When multi-UEs' SRS are positioned in the same time domain resource and same frequency domain resource, it is also possible to further divide the multi-UEs' SRS automatically by a method of configuring cyclic shift. According to the method of the present invention, the eNB may allocate SRS resources for multi-UEs more flexibly and effectively, which reduces disturbance to multi-UEs' SRS, improves the
(Continued)

decoding performance of physical layer, and thus improves the stability of a system.

16 Claims, 6 Drawing Sheets

(51) Int. Cl.
*H04W 24/02* (2009.01)
*H04W 16/10* (2009.01)
*H04W 72/04* (2009.01)

(56) References Cited

U.S. PATENT DOCUMENTS

| | | | |
|---|---|---|---|
| 2011/0013546 A1 | 1/2011 | Hao et al. | |
| 2011/0090862 A1 | 4/2011 | Liang et al. | |
| 2011/0294529 A1* | 12/2011 | Luo | H04L 5/0048 455/509 |
| 2012/0063371 A1* | 3/2012 | He | H04L 5/0007 370/280 |
| 2012/0113967 A1* | 5/2012 | Smith | H04B 1/7143 370/338 |
| 2012/0176999 A1* | 7/2012 | Zhang | H04L 1/0027 370/329 |

FOREIGN PATENT DOCUMENTS

| | | |
|---|---|---|
| CN | 101340383 A | 1/2009 |
| CN | 101384055 A | 3/2009 |
| CN | 101404794 A | 4/2009 |
| CN | 101404817 A | 4/2009 |
| CN | 101500242 A | 8/2009 |
| CN | 101651469 A | 2/2010 |
| CN | 101695191 A | 4/2010 |
| WO | 2009019062 A2 | 2/2009 |

OTHER PUBLICATIONS

3rd Generation Partnership Project, "3rd Generation Partnership Project; Technical Specification Group Radio Access Network; Physical layer aspects for evolved Universal Terrestrial Radio Access (UTRA) (Release 7)", 3GPP TR 25.814 V7.1.0, Sep. 9, 2006, pp. 71-93, 3GPP, France.

3rd Generation Partnership Project, "3rd Generation Partnership Project; Technical Specification Grou Radio Access Network; Evolved Universal Terrestrial Radio Access (E-UTRA); Radio Resource Control (RRC); Protocol Specification (Release 9)", 3GPP TS 36.331 V9.6.0, Mar. 1, 2011, pp. 1-252, 3GPP, France.

3rd Generation Partnership Project. "3rd Generation Partnership Project; Technical Specification Group Radio Access Network; Evolved Universal Terrestrial Radio Access (E-UTRA); Radio Resource Control (RRC); Protocol specification (Release 8)." 3GPP TS 36.331, V8.13.0, Mar. 2011, Sophia Antipolis Valbonne, France, 213 pages.

* cited by examiner

METHOD FOR ALLOCATING MULTI-UES' SOUNDING REFERENCE SIGNAL (SRS) UPLINK RESOURCES AND ENB

BACKGROUND OF THE INVENTION

Field of Invention

The present invention relates to communication field, and specifically to a method for allocating multi-UEs' Sounding Reference Signal (SRS) uplink resources, and an eNB for allocating multi-UEs' SRS uplink resources with the method.

Description of Prior Art

In an LTE (Long Term Evolution) system, Sounding Reference Signal (SRS) in an uplink channel is a signal sent to an eNB by a User Equipment (UE), which can be used for an eNB to sound and evaluate the quality of uplink channel. The eNB optimizes and adjusts the scheduling of uplink data according to the result of the sounding and evaluation, such as frequency resource occupied during uplink transmission, or the used modulation coding mode. In a TDD LTE mode, a UE can transmit a Sounding Reference Signal (SRS) in a normal uplink subframe or Uplink Pilot Time Slot (UpPTS) based on the configuration result sent from eNB. Herein, a criterion of configuring resource at UE can refer to relevant descriptions of 36.211 and 36.213 in 3GPP Provisions.

According to 3GPP, an E-UTRAN NodeB (eNB) can allocate the uplink resources of SRS for each UE in time and frequency domains by cell specific parameters in System Information Blocks (SIB) messages and by UE specific parameters in Radio Resource Control (RRC) messages. If there are multiple UEs in the cell, however, there is not a method for allocating uplink resources for each UE's SRS automatically both in time domain and frequency domain in the prior art.

CN Invention Patent Application (Publication No. CN 101330325A) involves allocating a resource for SRS of a terminal by a base station, wherein resource is allocated for one UE in frequency domain by an SRS bandwidth parameter (BSRS) and an SRS frequency range parameter (nRRC). This solution provides the method for allocating resource for one UE's SRS in frequency domain with an SRS bandwidth parameter (BSRS) and an SRS frequency range parameter (nRRC). However, this method just supports one UE's SRS resource allocation in frequency domain. It doesn't support resource allocation in both time and frequency domains automatically for multiple UEs' SRS.

CN Invention Patent Application (Publication No. CN 101335969A) involves a method for computing parameters of a resource for transmitting SRS in uplink pilot time slot (UpPTS) by a terminal. The SRS signal is transmitted on the resource. The index is determined by a frequency positions unit of random access channels, i.e., physical random access channel (PRACH) channels, when the PRACH channel contains a sub-carrier on a lower boundary of system bandwidth. The lower boundary of the system bandwidth is taken as the initial position of the maximal SRS bandwidth. This solution provides a method for allocating resources for one UE's SRS on frequency domain with initial position of the maximal SRS bandwidth. However, this method just supports one UE's SRS resources allocation in frequency domain. It doesn't support resource allocation in both time and frequency domains automatically for multiple UEs' SRS.

CN Invention Patent Application (Publication No. CN 101340383A) involves a method for determining resource block (RB) number of SRS bandwidth in frequency domain using the difference between the corresponding RB number of an uplink system bandwidth in the frequency domain and the maximum RB number occupied by a physical uplink control channel (PUCCH) in a time slot determined according to current system parameter. Therein the corresponding RB number of SRS-bandwidth is an even number, and corresponding prime factor of the corresponding RB number of SRS-bandwidth in the frequency domain comprises 2, 3 and 5. This solution provides the method for determining resource block (RB) number of SRS bandwidth in frequency domain. However, this method just supports SRS resource allocation in frequency domain with different resource blocks. It doesn't support resource allocation in both time and frequency domains automatically for multiple UEs' SRS.

US Utility Patent Application (Publication No. US 2009/0034468A1) involves a method for associating a sounding period to each sounding resource, and time-sharing the sounding resource across a set of UEs for different subframes. Therein the UEs require different sounding periods that are periodic and non-changing in time and allocating the time-sharing UEs to sub-frames in differing periods. A sounding resource sharing tree is formed recursively. A vertex of the sounding resource sharing tree is selected and the sounding resources are allocated based on the selected vertex. This solution provides the method for allocating sounding resource on time domain with different sounding periods. However, this method just supports SRS resource allocation on time domain with different period, but doesn't support resource allocation in both time and frequency domains automatically for multiple UEs' SRS.

PCT International Patent Application (Publication No. WO 2009/019062 A2) involves a method for determining different sets of configuration parameters for the sounding signal transmissions for a mobile terminal. The determined different sets of configuration parameters are transmitted to the mobile terminal, for enabling the mobile terminal to generate different sounding signals for different users such as channel-quality and timing estimations by the wireless communication network. This solution provides the method for allocating sounding signal resources for one mobile terminal with different configuration parameters sets. This method just supports one UE's SRS resource allocation with different sets of configuration parameters. It doesn't support resource allocation in both time and frequency domains automatically for multiple UEs' SRS.

CN Invention Patent Application (Publication No. CN 101404817A) involves a method for allocating bandwidth of SRS with respect to a user terminal of a particular cell, according to an allocation policy. The policy is defined with a principle that the usage amount of bandwidth is minimized when bandwidth allocation is changed. An instruction containing the bandwidth information is transmitted to the UE, before and after changing the bandwidth. This solution provides the method for allocating bandwidth of SRS for a UE. However, this method just supports one UE's SRS resource allocation in frequency domain with different bandwidth. It doesn't support SRS resource allocation in both time and frequency domains automatically for multiple UEs' SRS.

CN Invention Patent Application (Publication No. CN 101404794A) involves a method for determining the subframe offset for transmission of an SRS based on its transmission period, corresponding to the symbols used for transmitting the SRS in an uplink pilot time slot of a common uplink sub-frame. This solution provides the method to determine the sub-frame offset for SRS transmission on time domain. However, this method just supports SRS resource allocation in time domain with different sub-frame offset based on its transmission period. It doesn't support SRS resource allocation in both time and frequency domains automatically for multiple UEs' SRS.

As can be seen from the above, the existing solutions can just allocate SRS resources for single UE or just allocate SRS resources either in time domain or in frequency domain. They cannot allocate SRS resources for multiple UEs automatically both in time domain and frequency domain.

SUMMARY OF THE INVENTION

An object of the present invention is to provide a method for allocating multi-UEs' Sounding Reference Signal (SRS) uplink resources, and an eNB for allocating multi-UEs' SRS uplink resources with the same method. In accordance with the present invention, multi-UEs' SRS uplink resources can be allocated in both the time domain and the frequency domain automatically. The present invention can also support to divide multiple UEs' SRS resources with cyclic shift automatically when they are in samesame time domain resource and have identical frequency domain parameters in frequency domain.

According to one aspect of the invention, there provides a method for allocating multi-UEs' Sounding Reference Signal (SRS) uplink resources, the method comprising: inputting a value of an SRS period ($T_{SRS}$) and an attribute value of a system capacity; configuring a value of a time domain parameter srs-ConfigIndex for allocating time domain resources for the multi-UEs' SRS; configuring a value of a frequency domain parameter transmissionComb for mapping UEs' SRS in samesame time domain resource to different frequency domain resources; configuring a value of a cyclic shift parameter cyclicShift for further dividing UEs' SRS in samesame time domain resource and same frequency domain resource.

Therein the attribute value of the system capacity includes a minimum period ($T_{srs\_mini\_period}$) of SRS supported by the system, a maximum bearable number of UE's SRS ($n_{max\_SRS}$) per time domain resource in the minimum period, and a subframe offset ($T_{offset}$) of the SRS.

Preferably, only one time domain resource is usable in each minimum period for being allocated to the multi-UEs' SRS transmissions.

Therein the step of configuring a value of a time domain parameter srs-ConfigIndex comprises: determining the number of time domain resources available in the SRS period; determining a position ($P_{SRS\_Position}$) of a time domain resource allocated to each UE's SRS transmission in the SRS period; configuring the value of the time domain parameter srs-ConfigIndex for each of UEs according to the determined position of the time domain resource.

Optionally, the method further comprises, prior to the step of configuring a value of a time domain parameter srs-ConfigIndex, a step of checking whether the position of the time domain resource allocated to each of UEs exceeds the number of time domain resources available in the SRS period.

Therein the step of configuring a value of a frequency domain parameter transmissionComb comprises: providing an index for each of UEs in the same time domain resource; configuring the value of the frequency domain parameter transmissionComb for each of UE's SRS based on the UE's index.

Therein the step of configuring a value of a cyclic shift parameter cyclicShift comprises: providing an index for each of UEs in the same time domain resource; configuring the value of the cyclic shift parameter cyclicShift for each of UE's SRS based on the UE's index.

Therein the time domain resources comprise UpPTS in a special subframe, or any normal uplink subframe based on current uplink and downlink configurations.

According to another aspect of the invention, there provides an eNB for allocating multi-UEs' SRS resources using the preceding method of allocating multi-UEs' SRS uplink resources, the eNB comprising: a main control processing unit for configuring a time domain parameter srs-ConfigIndex, a frequency domain parameter transmissionComb and a cyclic shift parameter cyclicShift, for allocating multi-UEs' SRS resources; a downlink processing unit for sending the parameters configured by the main control processing unit to the respective UEs; and an uplink processing unit for receiving SRS sent by the respective UEs.

Therein the main control processing unit comprises: a time domain parameter configuring unit for configuring the value of the time domain parameter srs-ConfigIndex for allocating time domain resources to the multi-UEs' SRS; a frequency domain parameter configuring unit for configuring the value of the frequency domain parameter transmissionComb for mapping UEs' SRS in same time domain resource to different frequency domain resources; and a cyclic shift parameter configuring unit for configuring the value of the cyclic shift parameter cyclicShift for further distinguishing UEs' SRS in same time domain resource and same frequency domain resource.

The solution of the present invention not only supports allocating SRS resources for multiple UEs, but also can automatically allocate resources in both the time domain and the frequency domain at the same time. Furthermore, it can also support to divide multiple UEs' SRS resources with cyclic shift automatically when they are in the same time domain and same frequency domain.

The method and eNB of the present invention is capable of allocating multi-UEs' SRS uplink resources automatically based on the SRS period and an attribute value of the system capacity configured by communication system. It offers the flexibility to the system, because the solution can adjust the attribute value of the system capacity based on the system processing capability. It also offers high efficiency and intelligence of the system, because the solution can allocate multi-UEs' SRS uplink resources automatically. The method can also preferably allocate each of UE's SRS in time domain resource automatically in condition of enough time domain resources, thus can reduce the mutual interference between each UE's SRS in frequency domain to some extent, such that the decoding difficulty in physical layer can be reduced and the stability of the system is enhanced.

DETAILED DESCRIPTION OF PREFERRED EMBODIMENTS

For the object, solution and advantage of the present invention will be more explicit, exemplary embodiments of the present invention will be described in more details below with reference to the accompanying drawings.

Multi-UEs' SRS uplink resources allocation of the present invention comprises base station (eNB) and user equipment (UE) as a terminal.

Figure 1:
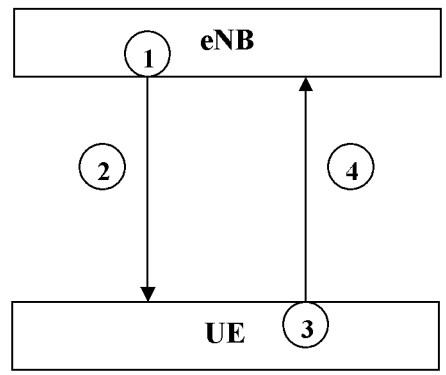
FIG. 1 is a schematic diagram of information interaction between an eNB and a terminal relating to SRS uplink resources allocation.

FIG. 1 is a schematic diagram of information interaction between an eNB and a terminal relating to SRS uplink resources allocation.

As shown in FIG. 1, SRS uplink resources allocation, SRS generation and transmission include the following 4 steps.

At step 1, an eNB configures associated parameter of SRS resources allocation for each of UE based on multiple UEs' Method of SRS resources allocation, i.e., UE specific parameter. In accordance with the section of 36.331 in 3GPP Provisions, the UE specific parameter of SRS mainly comprises a time domain parameter srs-ConfigIndex, a frequency domain parameter transmissionComb and a cyclic shift parameter cyclicShift.

A UE specific parameter shall be used for SRS uplink resources allocation. Here, the configuration of the parameter srs-ConfigIndex shall be used for determining UE's time domain resource allocation. The configuration of the parameter transmissionComb shall be used for determining UE's frequency domain resource allocation. The configuration of the parameter cyclicShift shall be used for determining SRS sequence generated by a UE.

At step 2, the eNB transmits configured UE specific parameters to a UE in a RRC message.

At step 3, the UE generates an SRS sequence according to the received cyclicShift parameter configuration.

At step 4, the UE sends an SRS to the eNB in the time domain resource and frequency domain resource allocated by the eNB according to the received srs-ConfigIndex and transmissionComb parameter configuration.

The method of SRS resources allocation in the aforementioned step 1 is used for an eNB, in the foregoing SRS processing, to configure the value of UE specific time domain parameters srs-ConfigIndex, transmissionComb and cyclicShift for each UE's SRS.

Figure 2:
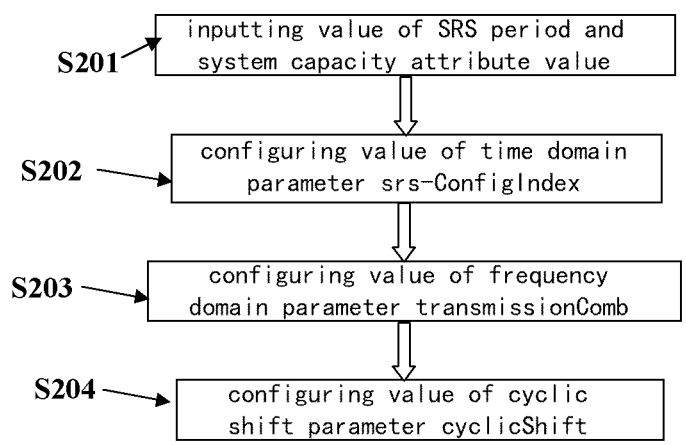
FIG. 2 is a schematic flow chart of configuring SRS uplink resources at the eNB side.

FIG. 2 is a schematic flow chart of configuring SRS uplink resources at the eNB side.

In the method of multi-UEs' SRS uplink resources allocation and the system thereof, it is mainly to configure the values of time domain parameter srs-ConfigIndex, transmissionComb, cyclicShift respectively on the basis of the processing capability of data transmission system and the allocated SRS transmission period, such that the multi-UEs' SRS uplink resources and the cyclic shift of SRS sequences can be allocated automatically and dynamically.

As shown in FIG. 2, the method of multi-UEs' SRS allocation of the present invention includes the following steps:

At step S201, a value of SRS period and a system capacity attribute value are inputted.

SRS period ($T_{SRS}$) refers to a period used by a UE to transmit an SRS to an eNB through an up link. The attribute value of the system capacity represents the capacity or processing capability of a system, and includes a minimum period ($T_{srs\_mini\_period}$) of SRS supported by the system, a maximum number of UE's SRS ($n_{max\_SRS}$) per time domain resource bearable in the minimum period, and a subframe offset ($T_{offset}$) of the SRS.

In the method and system of the present invention, the value of the supported minimum period can be configured and adjusted according to the system processing capability. In general, the range of the value is 5 ms≤ $T_{srs\_mini\_period}$≤$T_{SRS}$. The value of maximum number of UE's SRS ($n_{max\_SRS}$) bearable on a time domain resource can be determined and flexibly adjusted according to the system processing capability.

In addition, the sub-frame offset decides that the transmission is performed in which time domain resource (i.e., in which subframe of the minimum period) in a minimum period where the UE's SRS located. The value of the sub-frame offset can be configured according to Table 8.2-3 in 3GPP 36.213, and the range thereof is 0~9. The above method may configure and adjust the value of time domain parameter srs-ConfigIndex according to Table 8.2-2 and Table 8.2-3 in 3GPP 36.213 based on the configured sub-frame offset $T_{offset}$, such that the all of the UEs' SRS can be automatically allocated in the supported time domain resource.

At step S202, a value of time domain parameter srs-ConfigIndex is configured, in which the time domain parameter srs-ConfigIndex is used to allocate multiple UEs' SRS uplink resources in a time-sharing manner in time domain.

In an embodiment, it is preferable to utilize time domain resource to allocate SRS uplink resources, wherein the time domain parameter will be used by a UE to determine the resource allocated in time domain in each period.

According to the system processing capability, if the number of time domain resource available for SRS is configured large enough, and if an eNB can divide multiple UEs' SRS in time domain only by configuring the time domain parameter srs-ConfigIndex when it is configuring the parameters srs-ConfigIndex, transmissionComb, cyclicShift, the configuration of the frequency domain parameter transmissionComb and the cyclic shift parameter cyclicShift for the multiple UEs' SRS will result in a special value 0, which indicates that it is neither needed to divide the multiple UEs' SRS in frequency domain resource nor needed to further divide by cyclic shift based on the parameter cyclicShift.

At step S203, a value of frequency domain parameter transmissionComb is configured, in which the frequency domain parameter transmissionComb is used to allocate UE's SRS in same time domain resource in a frequency division manner in frequency domain.

This step is used for dividing UE's SRS resources in frequency domain by configuring different values of the frequency domain parameter, when there are multiple UEs' SRSs to be transmitted in same time domain resource. For example, the frequency domain parameter transmissionComb can indicate that whether a physical resource is mapped into a resource unit of odd number or even number while being mapped in frequency domain, and the range of transmissionComb may be 0 and 1.

If the values of frequency domain parameter transmissionComb of multiple UEs in same time domain resource are identical, it can be concluded that the multiple UEs are in same frequency domain resource and thus necessary for being further divided by cyclic shift based on a cyclic shift parameter cyclicShift.

At step S204, a value of cyclic shift parameter cyclicShift is configured, in which the cyclic shift parameter cyclicShift is used to divide UE's SRS uplink resources in the same time domain resource and same frequency domain resource by cyclic shift.

This step is used for further dividing UE's SRS resources with the method of configuring a cyclic shift parameter cyclicShift, when there are multiple UEs' SRSs in same time domain resource and in same frequency domain resource (i.e., have identical transmissionComb value). Herein, the cyclic shift parameter cyclicShift may be used for a UE to generate an SRS sequence.

The method of configuring the value of parameters srs-ConfigIndex, transmissionComb, cyclicShift will be described in details as below.

<Configuring a Value of Time Domain Parameter srs-ConfigIndex>

The method of configuring the value of time domain parameter srs-ConfigIndex during the above-mentioned SRS resources allocation will now be depicted. In the configured period (shared by all of UEs in a cell), the SRS uplink resources of each UE can be first allocated by preferably using a time domain resource with the configuration of time domain parameter srs-ConfigIndex($I_{srs}$), that is, multiple UEs' SRS can be divided preferably in a time division manner in time domain.

In the present invention, the time domain parameter srs-ConfigIndex is used for a UE to determine the time domain resource used for transmitting SRS in each period. For example, a UE may determine an SRS period and which time domain resource in each period is available for transmitting SRS according to srs-ConfigIndex ($I_{srs}$). The method of configuring the value of time domain parameter srs-ConfigIndex allocates a UE's SRS into a time domain resource of different system frames based on the input SRS period ($T_{SRS}$) and the attribute value of system capacity.

The value of time domain parameter srs-ConfigIndex may be configured in accordance with the following steps.

Firstly, the number of time domain resources available in the SRS period ($T_{SRS}$) is determined according to the following equation:

$$N_{srs\_position} = \text{floor}(T_{SRS}/T_{srs\_mini\_period})$$

wherein $N_{srs\_position}$ is the number of time domain resources available in the allocated SRS period.

$T_{SRS}$ is the time span of an SRS period, the range of $T_{SRS}$ supported in the method of the present invention is 5 ms~320 ms.

$T_{srs\_mini\_period}$ is the span of the minimum period of the SRS supported by a system. In the method and system of the present invention, the value of the supported minimum period can be configured and adjusted according to the system processing capability. In general, the range of this value is 5 ms ≤ $T_{srs\_mini\_period}$ ≤ $T_{SRS}$.

In an embodiment, the preferred configuration is that there is only one time domain resource in each minimum period available for allocating multiple UEs' SRS transmission. The time domain resource comprises an UpPTS in a special subframe, or any normal uplink subframe based on current uplink and downlink configurations (in accordance with 3GPP 36.211, Table 4.2-2: Uplink-Downlink Configurations). In an alternative embodiment, the time domain resource position available for allocating SRS transmission is preferably configured as UpPTS of the special subframe 6.

The function of floor floor(x) (also can be expressed as Floor(x)) is "downward integer" or "downward rounding", i.e., acquire maximal integer not more than x.

Next, the position of time domain resource allocated for each UE's SRS transmission is determined in the configured SRS period.

This step is to determine the value of position $P_{SRS\_Position}$ of the time domain resource available for the UE's SRS transmission in the configured SRS period, that is, to determine which of normal uplink subframes or which of special subframes in the SRS period can be used for the UE's SRS transmission, which can be determined according to the following equation:

$$P_{SRS\_Position} = \text{floor}((n_{userindex}-1)/n_{max\_SRS})$$

wherein $P_{SRS\_Position}$ is the position of time domain resource for transmitting SRS in the SRS period, i.e. is UpPTS of a special subframe or a normal uplink subframe which can be used for the UE's SRS transmission in the period. Its range is 0~$N_{srs\_position}$-1, wherein 0 represents the first available time domain resource position. In the subsequent step, the value of $P_{SRS\_Position}$ will be checked for validity, if it exceeds the available time domain resource range, the resources allocation will not be carried out for the UE's SRS.

$n_{userIndex}$ is the index of the UE in a cell, which is increasing in order of the UE accessing the cell and starts from 1, 2, . . .

$n_{max\_SRS}$ is the maximum number of the UE's SRS capable of being processed on the allocated time domain resource of each minimum period, this parameter depends on the actual processing capability of the system.

In the present invention, it is configured that only one time domain resource is usable in each minimum period for being allocated to the SRS transmissions.

Next, checking for each UE whether the position of the allocated time domain resource exceeds the number of time domain resource available in the SRS period, i.e., checking whether the value of $P_{SRS\_Position}$ meets the following conditions:

$$P_{SRS\_Position} > N_{srs\_position} - 1$$

wherein $N_{srs\_position}$ is the number of time domain resources available in the allocated SRS period. This step is mainly used to check whether the allocated $P_{SRS\_Position}$ exceeds the number of resources available on a time domain resource, thereby performs some protective processing. If $P_{SRS\_Position}$ exceeds the number of resources available on a time domain resource, the resources allocation is not performed for the UE. Consequently, the UE is not configured to transmit SRS in the RRC massage sent to itself. This step is optional, and it may be not carried out in an alternative embodiment.

Finally, the value of time domain parameter srs-ConfigIndex($I_{srs}$) for each UE is configured according to the following equation:

$$I_{srs}=(T_{SRS}+5)+P_{SRS\_Position}*T_{srs\_mini\_period}+T_{offset},$$

wherein $I_{srs}$ is the value of time domain parameter srs-ConfigIndex. A UE can determine the specific position of a time domain resource for SRS transmission in each period according to value of $I_{srs}$.

$T_{offset}$ is a subframe offset of the SRS. The sub-frame offset decides in which time domain resource the transmission is performed in a minimum period (i.e., in which subframe of the minimum period) for a UE's SRS. The value of the sub-frame offset can be configured according to Table 8.2-3 in 3GPP 36.213, and the range thereof is 0~9.

$T_{srs\_mini\_period}$ is the span of the SRS minimum period supported by the system, and its range is 5 ms≤ $T_{srs\_mini\_period}$≤$T_{SRS}$. The above-mentioned configuration method may configure and adjust the value of the sub-frame offset $T_{offset}$ and minimum period $T_{srs\_mini\_period}$ according to the system processing capability, thereby automatically allocates all of UEs' SRS into the supported time domain resource.

<Configuring a Value of Frequency Domain Parameter TransmissionComb>

When there are a plurality of UEs' SRS needed transmitting in same time domain resource, it is possible to allocate different resources on frequency domain by configuring the value of frequency domain parameter transmissionComb. That is, it is possible to further divide a UE's SRS having an identical time domain resource on frequency domain in a frequency division manner.

The method of configuring the value of frequency domain parameter transmissionComb in the above-described method of SRS resources allocation will be explained. The frequency domain parameter transmissionComb may be used for a UE to determine the physical resource mapped in frequency domain.

The method of configuring the value of frequency domain parameter in the present invention comprises the following steps:

Firstly, an index $I_{UE\_SRS\_Index}$ for each UE in same time domain resource is provided, which index starts with 1, 2, 3 . . .

In this step, when multiple UEs' SRS are in same time domain resource in that period, another index $I_{UE\_SRS\_Index}$, i.e., a second index, is provided for UEs in same time domain resource in ascending order of index $n_{userIndex}$ of each UE in the cell. The index increases in order from 1. The index $n_{userIndex}$ of UEs in the cell is allocated together by the system when the UEs access the cell, which increases from 1 in an order of UEs' accessing the cell.

After that, the value of frequency domain parameter transmissionComb for each UE's SRS is configured based on its index value, which may be configured according to the equation below:

$$transmissionComb=(I_{UE\_SRS\_Index}-1)\%2$$

wherein "%" indicates modular operation.

<Configuring a Value of Cyclic Shift Parameter CyclicShift>

The method of configuring the value of cyclic shift parameter cyclicShift in the above-described method of SRS resources allocation will be now explained.

When multiple UEs' SRS are in same time domain resource on time domain, and they are in same frequency domain resource on frequency domain (having identical value of transmissionComb), the UE's SRS is further divided by configuring cyclic shift parameter cyclicShift (n_SRS). That is, the UE's SRS uplink resources in the same time domain resource and same frequency domain resource are divided by cyclic shift.

Herein, the cyclic shift parameter cyclicShift may be used for a UE to generate SRS sequences. The range of cyclicShift may refer to the provision of 3GPP 36.331, for instance is 0~7.

The method of configuring the value of cyclic shift parameter cyclicShift in the present invention comprises:

The value of cyclic shift parameter cyclicShift can be configured for each UE's SRS based on the value of each UE's index $I_{UE-SRS-Index}$ provided previously, which can be configured according to the following equation:

$$cyclicShift=floor((I_{UE\_SRS\_Index}-1)/2)\%\ 8$$

Figure 3:
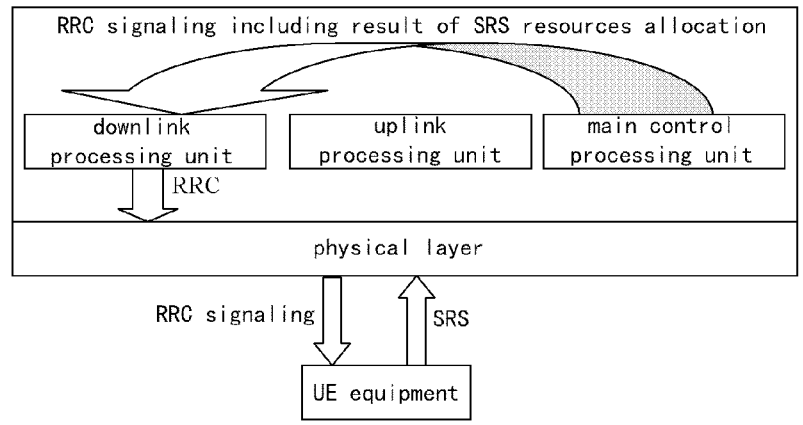
FIG. 3 is a schematic structural diagram of eNB for performing the method of SRS resource allocation according to the present invention.

FIG. 3 is a schematic structural diagram of an eNB for performing the method of SRS resource allocation according to the present invention.

As shown in FIG. 3, the eNB includes a main control processing unit, a downlink processing unit and an uplink processing unit.

A main control processing unit is used for configuring a time domain parameter srs-ConfigIndex, a frequency domain parameter transmissionComb and a cyclic shift parameter cyclicShift for multi-UEs, and for allocating multi-UEs' SRS resources. The main control processing unit transmits the RRC signaling including the configuring result of each parameter to the downlink processing unit after it has configured all of the parameters above-mentioned. The downlink processing unit is used for sending the value of individual parameter configured by the main control processing unit to the respective UEs through RRC signaling. After the UE has received each of parameters sent from the eNB, it generates SRS sequences according to the cyclic shift parameter, and configures SRS transmission resources according to the time domain parameter and frequency domain parameter, and then sends an SRS signal to the eNB with the resource. An uplink processing unit of an eNB is used for receiving SRS sent by the respective UEs.

Figure 4:
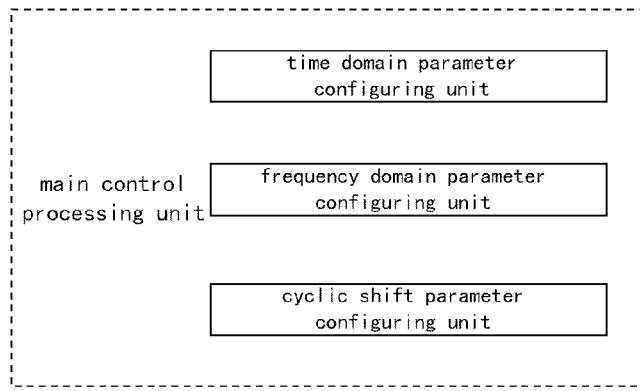
FIG. 4 is a schematic structural diagram of a main control processing unit of the eNB.

FIG. 4 is a schematic structural diagram of the main control processing unit of the eNB.

As shown in FIG. 4, the main control processing unit comprises a time domain parameter configuring unit, a frequency domain parameter configuring unit and a cyclic shift parameter configuring unit. These parameter configuring units may configure values of respective parameters by carrying out the foregoing method of configuring parameters.

A time domain parameter configuring unit is used for configuring the value of the time domain parameter srs-ConfigIndex for allocating time domain resources to the multi-UEs' SRS.

A frequency domain parameter configuring unit is used for configuring the value of the frequency domain parameter transmissionComb for mapping UEs' SRS in same time domain resource into different frequency domain resources.

A cyclic shift parameter configuring unit is used for configuring the value of the cyclic shift parameter cyclic- Shift for further dividing UEs' SRS in same time domain resource and frequency domain resource.

EMBODIMENT 1

The detailed procedure of configuring value of parameters srs-ConfigIndex, transmissionComb, cyclicShift on the eNB side has be depicted as mentioned above. Hereinafter, an exemplary embodiment is represented for describing the method of configuring each of the aforementioned parameters in detail.

Figure 5:
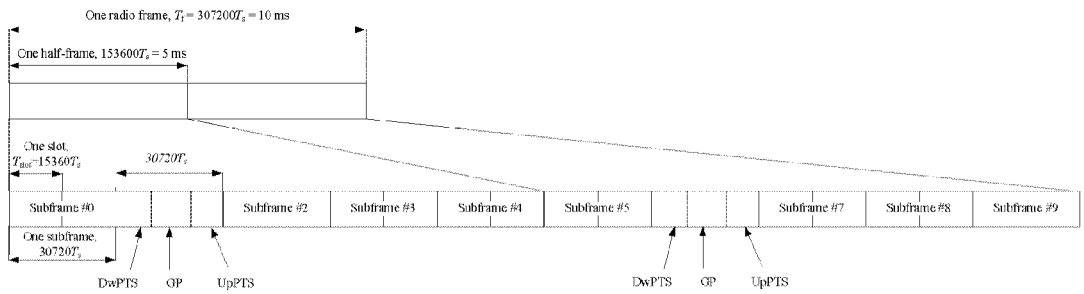
FIG. 5 shows the frame structure of TDD LTE according to the first embodiment.

FIG. 5 shows the frame structure of TDD LTE according to the first embodiment.

In general, LTE comprises two types of frame structure, wherein the type 1 of frame structure is used for FDD LTE, and the type of frame structure is used for TDD LTE. The SRS resources allocation in the present embodiment is preferably adaptive for type 2 of frame structure of TDD LTE.

As shown in FIG. 5, in the present embodiment, the frame structure is type 2, and the time span of the system frame is 10 ms. Because the method configures all of UEs' uplink SRS transmission with identical period ($T_{SRS}$), and there is only one time domain resource available for allocating SRS transmission in each of the minimum period, it is preferably configured to set the SRS minimum period $T_{srs\_mini\_period}$ supported by the system as 10 ms. In a minimum period, each UE's SRS resources allocation is performed only in a special subframe 6. The maximum number of UE's SRS bearable for the system on the UpPTS can be determined and flexibly adjusted according to the system processing capability.

In this embodiment, there are four UEs' SRS uplink resources needed to be allocated, the SRS period ($T_{SRS}$) is configured as 20 ms, the maximum number ($n_{max\_SRS}$) of UE's SRS supported on each of time domain resources (i.e., on each of the UpPTS) in the SRS minimum period is configured as 2, the value of sub-frame offset $T_{offset}$ of SRS in the minimum period is configured as 6. The four UEs needed to allocate SRS resources are UE1, UE2, UE3 and UE4 respectively, the index of each UE in the cell is allocated in the order of accessing the cell of UE, as the following:

index $n_{userIndex\_UE1}$ of UE1=1, index $n_{userIndex\_UE2}$ of UE2=2, index $n_{userIndex\_UE3}$ of UE3=3, index $n_{userIndex\_UE4}$ of UE4=4.

Next, the method of configuring the value of parameters srs-ConfigIndex, transmissionComb and cyclicShift on the eNB side will be described in detail based on the example shown in FIG. 5.

The method of configuring the value of the time domain parameter srs-ConfigIndex will be explained first.

Firstly, it can be determined that the number of UpPTS resource available for all of UEs' SRS transmission in each SRS period is 2, with the following equation.

$n_{UpPTS}$=floor($T_{SRS}/T_{srs\_mini\_period}$)=floor(20 ms/10 ms)=2.

Next, the value of the position $P_{UpPTS\_Position}$ of UpPTS available for each UE's SRS transmission in each of the configured period is determined, that is, which of UpPTS time domain resources may be used for each UE's SRS transmission in each period is determined.

Determining the position of the UpPTS occupied by UE1's SRS:

$P_{UpPTS\_Position\_UE1}$=floor($n_{UserIndex\_UE1}$-1)/$n_{max\_SRS}$)=floor((1-1)/2)=0;

wherein $n_{max\_SRS}$ is maximum number of UE's SRS bearable on each UpPTS in the minimum period.

Determining the position of the UpPTS occupied by UE2's SRS:

$P_{UpPTS\_Position\_UE2}$=floor(($n_{UserIndex\_UE2}$-1)/$n_{max\_SRS}$)=floor((2-1)/2)=0;

Determining the position of the UpPTS occupied by UE3's SRS:

$P_{UpPTS\_Position\_UE3}$=floor(($n_{UserIndex\_UE3}$-1)/$n_{max\_SRS}$)=floor((3-1)/2)=1;

Determining the position of the UpPTS occupied by UE4's SRS:

$P_{UpPTS\_Position\_UE4}$=floor(($n_{UserIndex\_UE4}$-1)/$n_{max\_SRS}$)=floor((4-1)/2)=1;

Finally, configuring the value of time domain parameter srs-ConfigIndex for each UE with the example of UpPTS in specific subframe 6, which can be configured according to the following equation:

the value of UE1's srs-ConfigIndex is configured as below:

$$I_{srs\_UE1} = (T_{SRS} + 5) + P_{UpPTS\_Position\_UE1} * T_{srs\_mini\_period} + 6$$
$$= (20 + 5) + 0*10 + 6 = 31;$$

the value of UE2's srs-ConfigIndex is configured as below:

$$I_{srs\_UE2} = (T_{SRS} + 5) + P_{UpPTS\_Position\_UE2} * T_{srs\_mini\_period} + 6$$
$$= (20 + 5) + 0*10 + 6 = 31;$$

the value of UE3's srs-ConfigIndex is configured as below:

$$I_{srs\_UE3} = (T_{SRS} + 5) + P_{UpPTS\_Position\_UE3} * T_{srs\_mini\_period} + 6$$
$$= (20 + 5) + 1*10 + 6 = 41;$$

the value of UE4's srs-ConfigIndex is configured as below:

$$I_{srs\_UE4} = (T_{SRS} + 5) + P_{UpPTS\_Position\_UE4} * T_{srs\_mini\_period} + 6$$
$$= (20 + 5) + 1*10 + 6 = 41.$$

Figure 6:
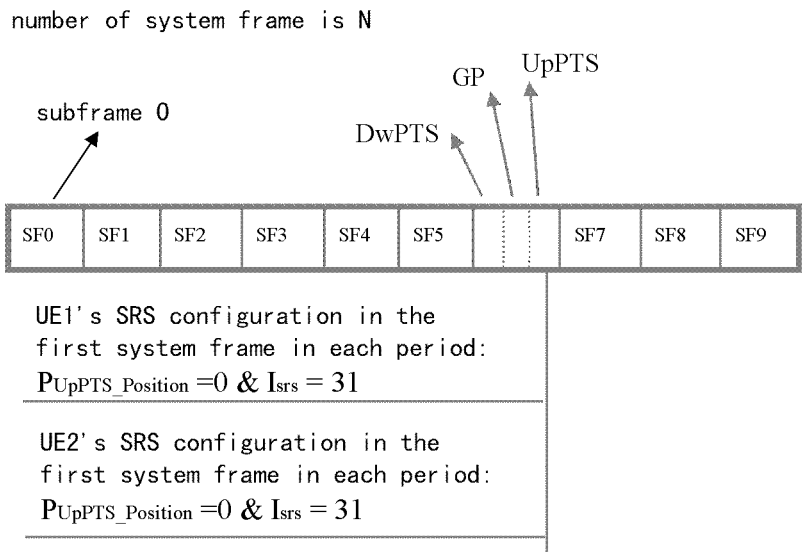
FIG. 6 shows the result of time domain parameter configuration of UE1, UE2 according to the first embodiment.

FIG. 6 shows the result of time domain parameter configuration of UE1, UE2 according to the first embodiment.

Figure 7:
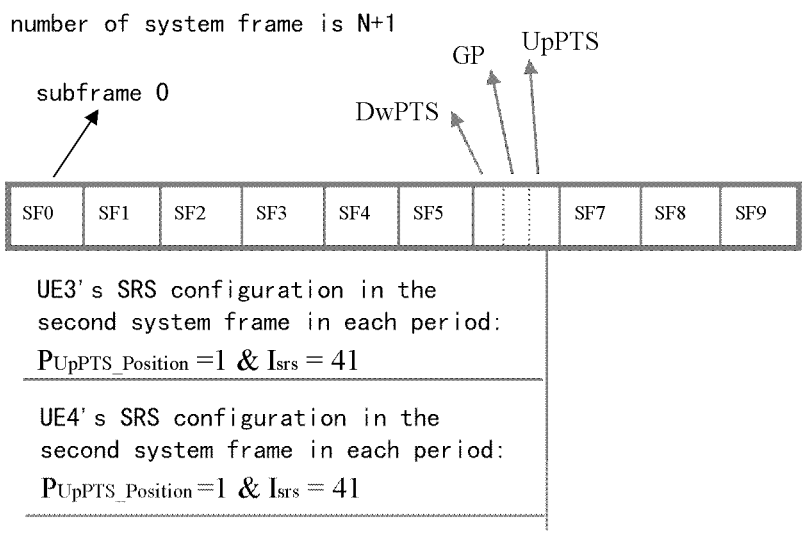
FIG. 7 shows the result of time domain parameter configuration of UE3, UE4 according to the first embodiment.

FIG. 7 shows the result of time domain parameter configuration of UE3, UE4 according to the first embodiment.

As shown in FIG. 6 and FIG. 7, according to the foregoing configuring result, the UE1 and UE2 transmit SRS in the UpPTS ($P_{UpPTS\_Position}=0$) of subframe 6 of first system frame in each period. The UE3 and UE4 transmit SRS in the UpPTS ($P_{UpPTS\_Position}=1$) of subframe 6 of second system frame in each period.

Next, the method of configuring the value of frequency domain parameter transmissionComb will be explained.

As shown in FIG. 6 and FIG. 7, in the present embodiment, since there are two UEs needed to allocate SRS resources in each UpPTS, for the sake of further dividing, it is necessary to allocate different frequency domain resources for the two UEs' SRS resources in the same UpPTS on frequency domain in a frequency division manner based on the value of frequency domain parameter transmissionComb.

The method of configuring the value of frequency domain parameter transmissionComb in the present embodiment comprises the following steps:

Firstly, providing an index for a UE's SRS on the same UpPTS in the period:

The UE1's SRS and UE2's SRS are positioned in same UpPTS time domain resource of first system frame in the period. Because the index of UE1 in the cell is small than that of UE2 in the cell, the index is allocated for UE1's SRS and UE2's SRS as the following:

index $I_{UE1\_SRS\_Index}$ of UE1's SRS is 1;
index $I_{UE2\_SRS\_Index}$ of UE2's SRS is 2.

The UE3's SRS and UE4's SRS are positioned in same UpPTS time domain resource of second system frame in the period. Because the index of UE3 in the cell is small than that of UE4 in the cell, the index is allocated for UE3's SRS and UE4's SRS as the following:

index $I_{UE3\_SRS\_Index}$ of UE3's SRS is 1;
index $I_{UE4\_SRS\_Index}$ of UE4's SRS is 2.

Next, the values of transmissionComb for UE1's SRS, UE2's SRS, UE3's SRS and UE4's SRS are configured according to the equations of:

transmissionComb for UE1's SRS=$(I_{UE1\_SRS\_Index}-1)\% 2=(1-1)\% 2=0$;

transmissionComb for UE2's SRS=$(I_{UE2\_SRS\_Index})\% 2=(2-1)\% 2=1$;

transmissionComb for UE3's SRS=$(I_{UE3\_SRS\_Index})\% 2=(1-1)\% 2=0$;

transmissionComb for UE4's SRS=$(I_{UE4\_SRS\_Index})\% 2=(2-1)\% 2=1$.

Figure 8:
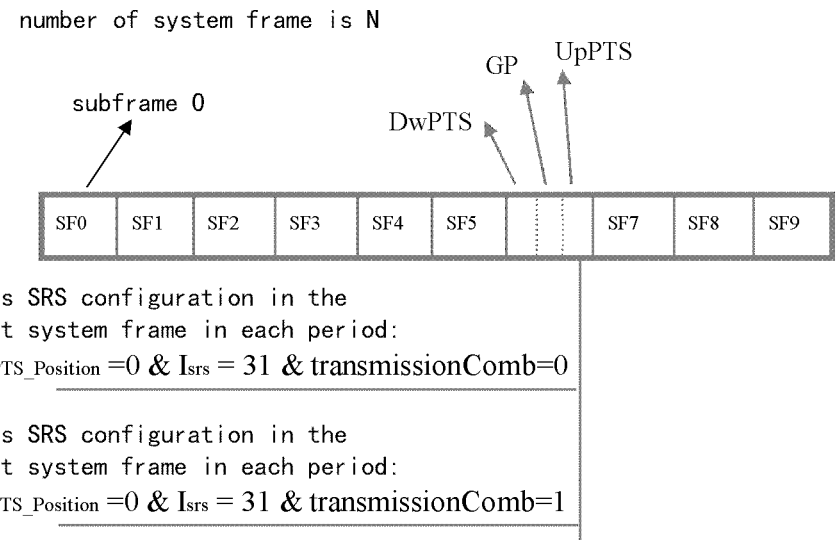
FIG. 8 shows the result of frequency domain parameter configuration of UE1, UE2 according to the first embodiment.

FIG. 8 shows the result of frequency domain parameter configuration of UE1, UE2 according to the first embodiment.

Figure 9:
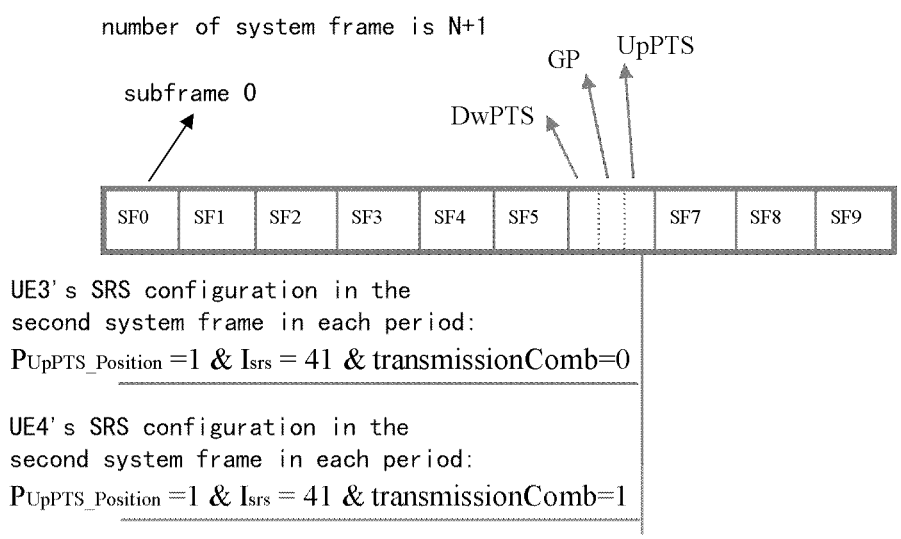
FIG. 9 shows the result of frequency domain parameter configuration of UE3, UE4 according to the first embodiment.

FIG. 9 shows the result of frequency domain parameter configuration of UE3, UE4 according to the first embodiment.

As shown in FIG. 8 and FIG. 9, according to the foregoing configuring result, the UE1 and UE2 transmit SRS in the same UpPTS of subframe 6 of first system frame in each period, and the SRS resources are divided on frequency domain with different transmissionComb values (i.e., $k_{TC}=0$, 1) so as to be allocated into different frequency domain resource. the UE3 and UE4 transmit SRS in the same UpPTS of subframe 6 of second system frame in each period, and the SRS resources are divided on frequency domain with different transmissionComb values (i.e., $k_{TC}=0$, 1) so as to be allocated into different frequency domain resource.

The method of configuring the value of cyclic shift parameter cyclicShift in the present embodiment will be described, which includes the following steps:

Firstly, indexes for UE's SRSs in the same time domain resource in that period are provided.

The UE1's SRS and UE2's SRS are positioned on same UpPTS time domain resource of first system frame in the period. The index is allocated for UE1's SRS and UE2's SRS as below:

index $I_{UE1\_SRS\_Index}$ of UE1's SRS is 1;
index $I_{UE2\_SRS\_Index}$ of UE2's SRS is 2.

The UE3's SRS and UE4's SRS are positioned on another same UpPTS time domain resource of second system frame in the period. The index is allocated for UE3's SRS and UE4's SRS as below:

index $I_{UE3\_SRS\_Index}$ of UE3's SRS is 1;
index $I_{UE4\_SRS\_Index}$ of UE4's SRS is 2.

Next, the values of cyclicShift for UE1's SRS, UE2's SRS, UE3's SRS and UE4's SRS are configured according to the equations of:

$$\text{cyclicShift for } UE1's\,SRS = \text{floor}\,((I_{UE1\_SRS\_Index}-1)/2)\,\%\,8$$
$$= \text{floor}\,((1-1)/2)\,\%\,8$$
$$= 0;$$

$$\text{cyclicShift for } UE2's\,SRS = \text{floor}\,((I_{UE2\_SRS\_Index}-1)/2)\,\%\,8$$
$$= \text{floor}\,((2-1)/2)\,\%\,8$$
$$= 0;$$

$$\text{cyclicShift for } UE3's\,SRS = \text{floor}\,((I_{UE3\_SRS\_Index}-1)/2)\,\%\,8$$
$$= \text{floor}\,((1-1)/2)\,\%\,8$$
$$= 0;$$

$$\text{cyclicShift for } UE4's\,SRS = \text{floor}\,((I_{UE4\_SRS\_Index}-1)/2)\,\%\,8$$
$$= \text{floor}\,((2-1)/2)\,\%\,8$$
$$= 0;$$

Figure 10:
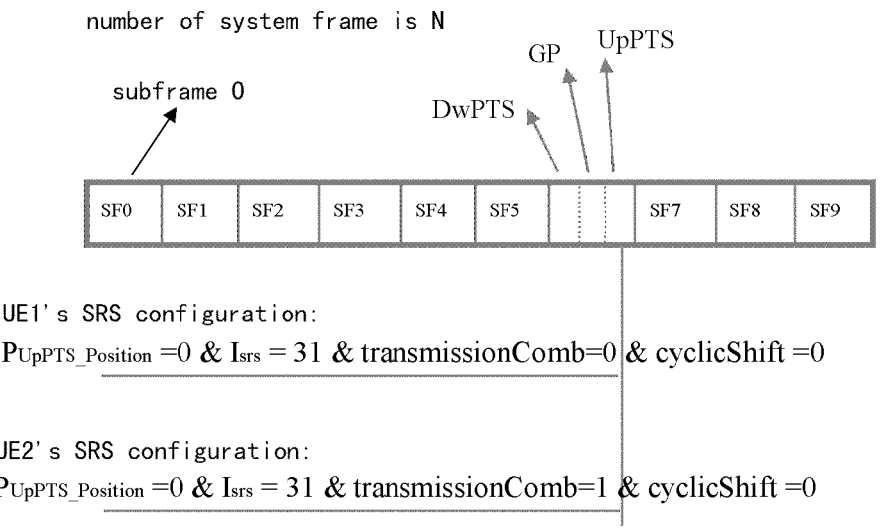
FIG. 10 shows the result of cyclic shift parameter configuration of UE1, UE2 according to the first embodiment.

FIG. 10 shows the result of cyclic shift parameter configuration of UE1, UE2 according to the first embodiment.

Figure 11:
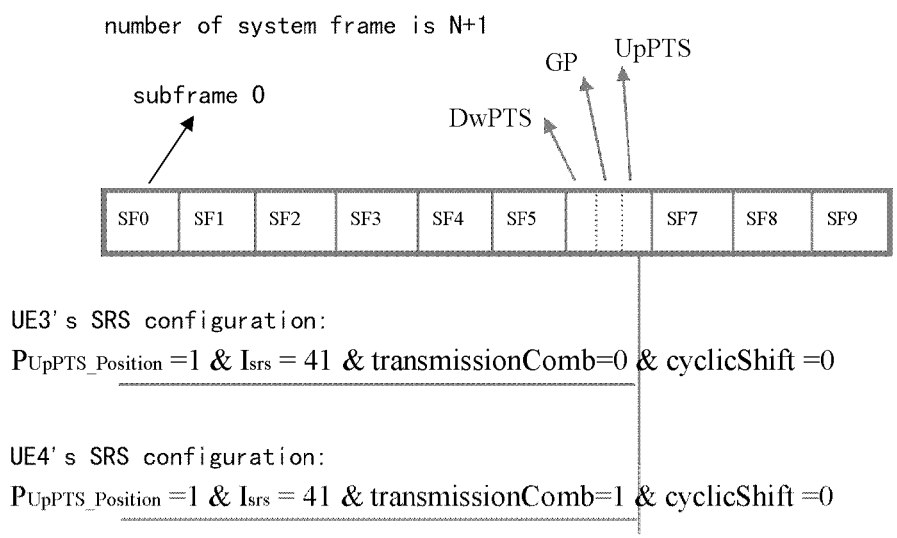
FIG. 11 shows the result of cyclic shift parameter configuration of UE3, UE4 according to the first embodiment.

FIG. 11 shows the result of cyclic shift parameter configuration of UE3, UE4 according to the first embodiment.

As shown in FIG. 10 and FIG. 11, the UE1 and UE2 send SRS on the UpPTS in subframe 6 of the first system frame in each period by using SRS sequences generated with an identical cyclicShift value. The UE3 and UE4 send SRS on the UpPTS in subframe 6 of the second system frame in each period by using SRS sequences generated with the identical cyclicShift value. In the present embodiment, all of the configured cyclicShift values of each UE are 0, for it is possible to further divide the two UEs in same UpPTS on frequency domain based on different values of frequency domain parameter transmissionComb, and thus it is not needed to further divide by cyclic shift based on cyclic shift parameter cyclicShift.

In the embodiment 1, the UpPTS available for UE1 and UE2's SRS transmission in the configured period are positioned in the subframe 6 of first system frame. Similarly, the UpPTS available for UE3 and UE4's SRS transmission in the configured period are positioned in the subframe 6 of second system frame. Herein, it is assumed that the number of the first system frame in the foresaid period is N, and the number of the second system frame in that period is N+1, which means that the second system frame is the next system frame adjacent to the first system frame. In the present embodiment, it is preferable to perform SRS uplink resources allocation on the UpPTS of the special subframe 6, however, the present invention is not limited to thereto, it is also possible to perform SRS uplink resources allocation on the UpPTS of other special subframe (for instance, subframe 1) or on the common uplink subframe.

Figure 12:
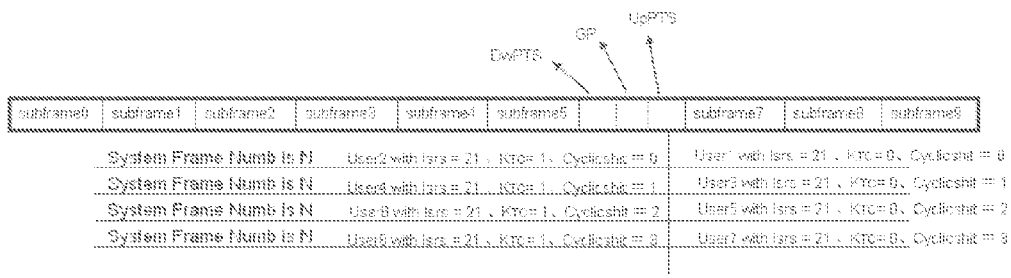
FIG. 12 shows the result of SRS resource allocation according to the second embodiment of the present invention.
Figure 13:
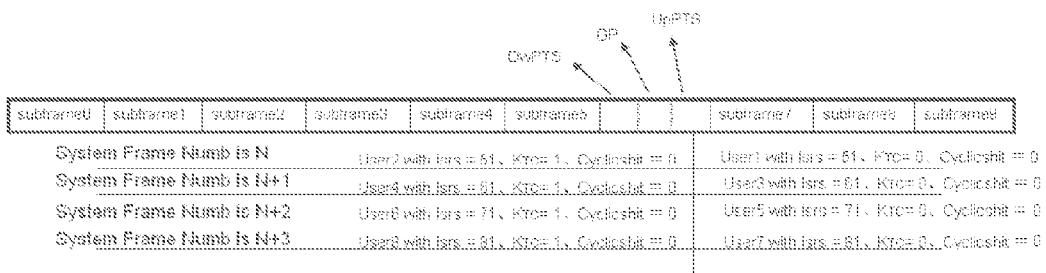
FIG. 13 shows the result of SRS resource allocation according to the third embodiment of the present invention.
Figure 14:
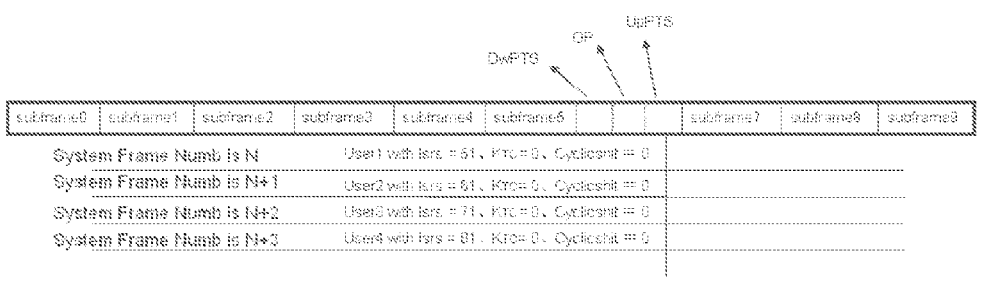
FIG. 14 shows the result of SRS resource allocation according to the fourth embodiment of the present invention.

FIGS. 12, 13 and 14 show some illustrative configuring results of the method of SRS resources allocation of the present invention, respectively.

EMBODIMENT 2

FIG. 12 shows the result of SRS resource allocation according to embodiment 2 of the present invention.

The embodiment shown in FIG. 12 describes the situation of SRS resources allocation based on different values of cyclic shift parameter cyclicShift.

In FIG. 12, the SRS minimum period supported by the system is 10 ms, and only the UpPTS resource of the sixth subframe can be used for SRS transmission allocation in each of the minimum periods. The SRS period ($T_{SRS}$) is configured as 10 ms, and the maximum number of UE's SRS bearable on each UpPTS is 8 in the configured minimum period. The UE's SRS resource allocation is performed in the UpPTS of the sixth subframe of each system frame in the period, thus there are eight UEs needed to allocate uplink resources.

As shown in FIG. 12, because the maximum number of UE's SRS bearable on each UpPTS is 8 in the configured minimum period, the eight UEs' SRS are allocated into same UpPTS (ConfigIndex($I_{srs}$)=21).

Then, the eight UEs' SRS resources in the same UpPTS are divide into two groups on frequency domain based on different values of frequency domain parameter transmissionComb ($k_{TC}$=0, 1), wherein each group contains four UEs respectively. Furthermore, for the four UEs in each group, for instance for the first, third, fifth and seventh UE, since they are positioned in the same UpPTS ($I_{srs}$=21) on time domain and have identical value ($k_{TC}$=0) of frequency domain parameter transmissionComb on frequency domain, it is needed to further divide the four UEs' SRS based on different values (cyclicShift=0, 1, 2, 3) of cyclic shift parameter cyclicShift. That is, it is needed to divide these UE's SRS in the same UpPTS on time domain and having identical transmissionComb value on frequency domain by means of cyclic shift. As shown in FIG. 12, the method for the second, forth, sixth and eighth UEs' SRS resources allocation are Similar.

EMBODIMENT 3

FIG. 13 shows the result of SRS resource allocation according to embodiment 3 of the present invention.

The embodiment shown in FIG. 13 describes the situation of SRS resources allocation based on different values of frequency domain parameter transmissionComb.

In FIG. 13, the SRS minimum period supported by the system is 10 ms, and only the UpPTS resource of the sixth subframe can be used for SRS transmission allocation in each of the minimum periods. The SRS period ($T_{SRS}$) is configured as 40 ms and the maximum number of UE's SRS bearable on each UpPTS is 2 in the configured minimum period.

The UE's SRS resource allocation is performed in the UpPTS of the sixth subframe of each system frame in the period, thus there are eight UEs needed to allocate uplink resources.

As shown in FIG. 13, because the maximum number of UE's SRS bearable on each UpPTS is 2 in the configured minimum period, the eight UEs' SRS are allocated into four UpPTS (ConfigIndex($I_{srs}$)=51, 61, 71, 81) respectively. Then, the two UEs' SRS resource in the same UpPTS are divided on frequency domain based on different values of frequency domain parameter transmissionComb ($k_{TC}$=0, 1). For example, the third and fourth UEs are allocated in the UpPTS in which the ConfigIndex($I_{srs}$) value is 61, and then the two UEs' SRS resources allocation are further divided based on different transmissionComb values ($k_{TC}$=0, 1). In the present embodiment, since the two UEs in the same UpPTS can be divided on frequency domain based on different values of frequency domain parameter transmissionComb, they are not needed to further divide by cyclic shift based on cyclic shift parameter cyclicShift. Therefore, the configured cyclicShift value of each UE is 0.

EMBODIMENT 4

FIG. 14 shows the result of SRS resource allocation according to embodiment 4 of the present invention.

The embodiment shown in FIG. 14 describes the situation of SRS resources allocation based on different values of time domain parameter srs-ConfigIndex.

In FIG. 14, the SRS minimum period supported by the system is 10 ms, and only the UpPTS resource of the sixth subframe can be used for SRS transmission allocation in each of the minimum periods. The SRS period ($T_{SRS}$) is configured as 40 ms and the maximum number of UE's SRS bearable on each UpPTS is 1 in the configured minimum period. The UE's SRS resource allocation is performed in the UpPTS of the sixth subframe of each system frame in the period, thus there are four UEs' SRS needed to allocate uplink resources.

As shown in FIG. 14, because the maximum number of UE's SRS bearable on each UpPTS is 1 in the configured minimum period, the four UEs' SRS are allocated into four different UpPTS (ConfigIndex($I_{srs}$)=51, 61, 71, 81) respectively. In the present embodiment, there is only one UE's SRS allocated in each UpPTS, that is, the four UEs' SRS uplink resources can be allocated only by configuring time domain parameter, thereby it is not needed to further divide based on the frequency domain parameter transmissionComb and cyclic shift parameter cyclicShift. Accordingly, as shown in FIG. 14, the configured transmissionComb value and cyclicShift value of each UE are 0.

In the above-mentioned embodiment, $K_{TC}$ represents frequency domain parameter transmissionComb, $I_{srs}$ represents time domain parameter srs-ConfigIndex, and cyclicShift represents cyclic shift parameter cyclicShift.

As described above, the present invention provides a method for allocating multi-UEs' SRS uplink resources and an eNB for allocating multi-UEs' SRS uplink resources with the method. The method automatically and dynamically allocates multi-UEs' SRS resource in accordance with the system capacity attribute value and the configured SRS transmission period. In the configured period (shared by all of UEs in a cell), the SRS uplink resources of each UE can be first allocated by preferably using a time domain resource with the configuration of time domain parameter srs-ConfigIndex($I_{srs}$). That is, multiple UEs' SRS resources can be divided preferably in a manner of time-sharing on time domain. Then, when there are a plurality of UEs' SRS needed transmitting in same time domain resource, the UEs' SRS resources are further allocated on frequency domain with the method of configuring frequency domain parameter transmissionComb. That is, it is possible to further divide UE's SRS having identical time domain resource on frequency domain in a frequency division manner. Finally, when multiple UEs' SRS are in same time domain resource on time domain, and they are in same frequency domain resource on frequency domain, the UE's SRS can be further divided by configuring the cyclic shift parameter cyclicShift. That is, the UE's SRS uplink resources in the same time domain resource and same frequency domain resource can be divided by cyclic shift.

The method and eNB of the present invention are capable of allocating multi-UEs' SRS uplink resources automatically based on the SRS period and the system capacity attribute value configured by communication system. It is capable of offering flexibility of the system for this solution can adjust the system capacity attribute value based on the system processing capability. It may also offer high efficiency and intelligence to the system for this solution can allocate multi-UEs' SRS uplink resources automatically. The method can also preferably allocate each of UE's SRS in time domain resource automatically in condition of enough time domain resources, thus can reduce the mutual interference between each UE's SRS in frequency domain to some extent, such that the decoding difficulty in a physical layer can be reduced and the stability of the system is enhanced.

With the embodiments mentioned above, it is apparent for the skilled person in the present art that the present invention may be implemented with hardware, and may also be implemented with software together with required hardware platform. Based on such appreciation, the solution of the present invention may be stored in a storage device or a non-volatile storage medium (such as CD-ROM, USB disk and a movable hard disk) of an eNB in the form of software program, and then many instructions of the software program can be executed by the main control processing unit of the eNB. It is also possible to implement the solution of the present invention based on a hardware logical circuit, such as those parameter configuring units in the present invention, which can be installed to the eNB to constitute components of the main control processing unit.

The method of allocating multi-UEs' SRS uplink resources and the eNB are mainly used for a LTE system, but are not limited to thereto, and they may also be used for other communication system.

It should be understood that the above-described implementations of the present invention are only used to illustratively describe or explain the concept of the present invention, but not to limit the present invention. Therefore, any alteration, equivalent substitution, modification and the like should be included in the protective scope of the present invention without departing from the spirit and scope thereof. In addition, the appended claims of the present invention are intended to embrace all of alterations and modifications falling within the scope and boundary of these claims, or in the equivalents of such scope and boundary.

What is claimed is:

1. A method, implemented by a base station, of allocating Sounding Reference Signal (SRS) uplink resources to multiple User Equipments (UEs), the method comprising:
    inputting a value of an SRS period ($T_{SRS}$) of a system, a minimum period ($T_{srs\_mini\_period}$) of SRS supported by the system, a maximum number of a UE's SRS ($n_{max\_SRS}$) per time domain resource bearable in the minimum period, and a subframe SRS offset ($T_{offset}$);
    configuring a value of a time domain parameter (srs-ConfigIndex) for allocating time domain resources for the UEs' SRS;
    configuring a value of a frequency domain parameter (transmissionComb) for mapping the UEs' SRS in same time domain resource to different frequency domain resources;
    configuring a value of a cyclic shift parameter (cyclicShift) for further dividing the UEs' SRS in same time domain resource and frequency domain resource;
    transmitting the srs-ConfigIndex, transmissionComb, and cyclicShift parameters configured by the base station to the respective UEs.

2. The method of claim 1, wherein only one time domain resource is usable in the minimum period for being allocated to the UEs' SRS.

3. The method of claim 1, wherein the configuring the value of the time domain parameter comprises:
    determining a number of time domain resources available in the SRS period;
    determining a position ($P_{SRS\_Position}$) of a time domain resource allocated to each UE's SRS transmission in the SRS period;
    configuring a value of the time domain parameter for each of the UEs according to the determined position of the time domain resource.

4. The method of claim 3, wherein srs-ConfigIndex is configured according to:

$$(T_{SRS}+5)+P_{SRS\_Position}*T_{srs\_mini\_period}+T_{offset};$$

wherein $T_{SRS}$ is the value of the SRS period;
$P_{SRS\_Position}$ is a position of a time domain resource in the SRS period allocated to each UE's SRS transmission;
$T_{srs\_mini\_period}$ is the minimum period of SRS supported by the system; and
$T_{offset}$ is the subframe SRS offset.

5. The method of claim 3, further comprising checking, prior to the configuring the value of the time domain parameter, whether the position of the time domain resource allocated to each of the UEs exceeds a number of time domain resources available in the SRS period.

6. The method of claim 1, wherein the configuring the value of the frequency domain parameter comprises:
    providing an index for each of UEs in the same time domain resource;
    configuring the value of the frequency domain parameter for each of the UE's SRS based on the UE's index.

7. The method of claim 6, wherein the value of the frequency domain parameter is configured according to:
    transmissionComb=$(I_{UE\_SRS\_Index}-1)\% 2$
    wherein $I_{UE\_SRS\_Index}$ denotes an index of a UE in the time domain resource.

8. The method of claim 1, wherein the configuring the value of the cyclic shift parameter comprises:
    providing an index for each of UEs in the same time domain resource;
    configuring the value of the cyclic shift parameter for each of the UE's SRS based on the UE's index.

9. The method of claim 8, wherein the value of the cyclic shift parameter is configured according to:

$$\text{cyclicShift}=\text{floor}((I_{UE\_SRS\_Index}-1)/2)\% 8$$

wherein $I_{UE\_SRS\_Index}$ denotes an index of a UE in the time domain resource.

10. The method of claim 1, wherein all of the UEs' SRS are configured to have an identical period.

11. The method of claim 1, wherein the time domain resources comprise an Uplink Pilot Time Slot in a special subframe, or any normal uplink subframe, based on current uplink and downlink configurations.

12. A base station comprising:
a main control processing circuit configured to:
configure a time domain parameter (srs-ConfigIndex);
configure a frequency domain parameter (transmissionComb);
configure a cyclic shift parameter (cyclicShift); and
allocate Sounding Reference Signal (SRS) resources to multiple User Equipments (UEs);
a downlink processing circuit configured to send the srs-ConfigIndex, transmissionComb, and cyclicShift parameters configured by the main control processing circuit to the respective UEs;
an uplink processing circuit for receiving SRS sent by the respective UEs;
wherein the main control processing circuit inputs an SRS period ($T_{SRS}$) of a system, a minimum period ($T_{srs\_mini\_period}$) of SRS supported by the system, a maximum number of the UE's SRS ($n_{max\_SRS}$) per time domain resource bearable in the minimum period, and a subframe SRS offset ($T_{offset}$) and comprises:
a time domain parameter configuring circuit arranged to configure a value of the time domain parameter to allocate time domain resources to the UEs' SRS;
a frequency domain parameter configuring circuit arranged to configure a value of the frequency domain parameter to map UEs' SRS in same time domain resource to different frequency domain resources;
a cyclic shift parameter configuring circuit arranged to configure a value of the cyclic shift parameter for further dividing UEs' SRS in same time domain resource and frequency domain resource.

13. The base station of claim 12, wherein the time domain parameter configuring circuit is arranged to configure the srs-ConfigIndex according to:

$$(T_{SRS}+5)+P_{SRS\_Position} T_{srs\_mini\_period}+T_{offset};$$

wherein $T_{SRS}$ is a value of an SRS period;
$P_{SRS\_Position}$ is a position of a time domain resource in the SRS period allocated to each UE's SRS transmission;
$T_{srs\_mini\_period}$ is a minimum period of SRS supported by the system; and
$T_{offset}$ is a subframe offset of the SRS.

14. The base station of claim 12, wherein the frequency domain parameter configuring circuit is arranged to configure the value of the frequency domain parameter according to:

$$\text{transmissionComb}=(I_{UE\_SRS\_Index}-1)\% 2$$

wherein $I_{UE\_SRS\_Index}$ denotes an index of a UE in the time domain resource.

15. The base station of claim 12, wherein the cyclic shift parameter configuring circuit is arranged to configure the value of the cyclic shift parameter according to:

$$\text{cyclicShift}=\text{floor}((I_{UE\_SRS\_Index}-1)/2)\% 8$$

wherein $I_{UE\_SRS\_Index}$ denotes an index of a UE in the time domain resource.

16. The base station of claim 12, wherein the time domain resources comprise an Uplink Pilot Time Slot in a special subframe, or any normal uplink subframe, based on current uplink and downlink configurations.

* * * * *